United States Patent Office 2,715,091
Patented Aug. 9, 1955

2,715,091

DEXTRAN SULFATE AS ANTICOAGULANT, PROCESS OF PREPARING SAME, AND STERILE SOLUTION THEREOF

Colin Robert Ricketts and Kenneth Walter William Henry Walton, Birmingham, England, assignors to National Research Development Corporation, London, England, a British corporation No Drawing. Application November 18, 1950, Serial No. 196,524

Claims priority, application Great Britain November 28, 1949

9 Claims. (Cl. 167—65)

This invention relates to the manufacture of anticoagulants for use with blood and plasma, and one object is to provide anticoagulants which may be readily prepared on a large scale. A further object of the invention is to provide anticoagulants which are non-toxic.

Anticoagulants, i. e. substances which prevent blood from clotting, have a wide application in medicine and other biological sciences. They may be used to prevent blood from clotting (a) after blood has been shed ("in vitro") or (b) used within the body ("in vivo"). In case (a), the fluid blood may be readily handled for subsequent transfusion and for many forms of haematological testing (e. g. erythrocyte sedimentation rate, haematocrit, etc.). For such work, anticoagulants should not affect the erythrocyte properties, and should not interfere with the usual haematological tests in other ways. In case (b), repeated administration is usually required, as the conditions likely to result in intravascular thrombosis (e. g. the effects of coronary thrombosis) usually take many weeks to disappear. It is therefore essential that an anticoagulant used in this way shall not cause toxic effects even after prolonged and repeated administration. The prophylactic administration of anticoagulants in conditions where past experience shows that thrombosis may occur (e. g. after abdominal operations, etc.) is also frequently desirable.

The only previously described substance which has a sufficiently low toxicity for administration "in vivo" is the naturally occurring substance "heparin." The present market price of heparin is about £5 per gramme, since it has to be prepared from animal carcasses, in which it is present in minute quantities. Heparin is also in demand for use "in vitro," but in view of its expense, sodium citrate has been used extensively as a substitute for heparin. However, sodium citrate is not ideal for use in this connection, and it has been suggested that certain heparin-like compounds might combine the desirable properties of heparin with ease of preparation on a large scale. Such heparin-like compounds might assist the survival of the cellular components of the blood, such as the leucocytes and platelets to a greater extent than does sodium citrate.

Various polysaccharides with sulphate groups have been shown to possess anticoagulant properties similar to those of heparin, but none has been considered suitable for administration "in vivo." Such compounds, especially those derived from bacterial dextran and certain other compounds, can be produced in large quantities and at low cost.

One compound recently proposed for use as an anticoagulent (see Upsala Läkereförenings Förhändlingar, NF 50–51, 144–46) is a sulphuric acid ester of partially-hydrolysed dextran.

According to this invention there is provided an anticoagulant consisting of, or comprising mainly, a water-soluble salt of dextran sulphate, the latter being the sulphuric-acid ester of a dextran having an intrinsic viscosity less than 0.12 (measured at 37° C. in a B. S. S. No. 1 Viscometer) and said ester having a sulphur content, calculated on its sodium salt, of not less than 9 per cent.

The said sulphuric ester may have up to three sulphate groups per glucose unit.

The anticoagulant according to this invention may be successfully employed "in vitro" or "in vivo."

The anticoagulant of this invention is non-toxic, and, when employed for blood or plasma, does not interfere with the erythrocyte properties of the blood, or the usual haematological tests in any way. Since the said anticoagulant prevents clotting after the blood has been shed, the fluid treated therewith can be readily handled for subsequent transfusion. Like heparin, the anticoagulant properties of the dextran sulphate produced by the invention may be counteracted "in vivo" or "in vitro" by certain basic substances (e. g. protamine); this is a very desirable property in case of emergency, for example in cases of sudden haemorrhage.

The following is the graphic formula of a dextran sulphate from which the anticoagulant of this invention is prepared:

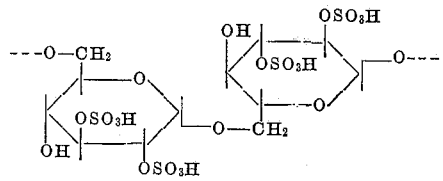

The following shows the difference between the molecular weights, as deduced from their intrinsic viscosities, of the dextrans employed in the preparation of the said known sulphuric-acid ester of partially hydrolysed dextran and of the dextrans employed in the preparation of the dextran sulphates salts according to this invention.

1. Known dextran sulphates: Molecular weight of dextran employed, 22,000–200,000; dextrans of such molecular weights have an intrinsic viscosity of at least 0.12, which increases with increasing molecular weight.

2. Dextran sulphate compounds according to this invention:

In the case of three compounds produced, the dextrans employed each had a molecular weight of less than 22,000 and an intrinsic viscosity of less than 0.12.

The following is an example of the preparation of a non-toxic anticoagulant dextran sulphate salt according to the invention:

(1) *Degradation of dextran of high molecular weight*

100 ml. N sulphuric acid are added to 1 litre of 6% dextran and the solution is boiled under reflux for 4 hours. The pH before and after heating is 1.4. The solution is neutralised with about 100 ml. N sodium hydroxide. 1,158 ml. of solution of degraded dextran is obtained.

In order to ascertain the approximate extent of degradation resulting from the above operation, a sample of the resultant solution may be diluted to 3% dextran and the relative viscosity of such diluted sample determined in an Ostwald Viscometer. (In experiments, values in the range 1.11 to 1.16 have been obtained for this relative viscosity).

(2) *Fractionation*

985 ml. acetone are added to 1,145 ml. of the solution of degraded dextran (86) ml. acetone per 100 ml. solution) slowly and with good stirring at 20° C. The syrup formed is allowed to settle and the supernatant solution is separated as completely as possible. To this supernatant solution, 1,875 ml. acetone is added again slowly and with good stirring at 20° C., bringing the acetone concentration to 250 ml. per 100 ml. of degraded dextran solution. The syrup is separated, poured into alcohol, ground to a powder, washed with dry ether and dried in vacuo over phosphorus pentoxide. A yield of 31 g. or 50.5% of the theoretical yield of degraded and fractionated dextran was obtained in one experiment (58.5% was obtained in another experiment), and the intrinsic viscosity of such dextran was 0.03. In three further experiments, dextrans having intrinsic viscosities of from 0.022 to 0.034 were obtained.

(3) *Sulphation*

In a 1 litre bolt head flask 400 ml. of dry pyridine is stirred vigorously and cooled by a solid carbon-dioxide-alcohol bath, whilst 88 ml. of chlorosulphonic acid are added drop by drop. A mass of pyridinium salts is precipitated and should be kept in motion by the stirrer. Local heating, which is indicated by the development of a yellow colour, should be avoided.

When all the chlorosulphonic acid has been added the temperature is raised to 65° C., using a water bath, with the result that much of the aforesaid precipitate of pyridinium salts dissolves. 60 g. of finely powdered dextran (end product of stage 2) are added and dispersed in the reaction mixture by the stirrer. The temperature is maintained at 65 to 70° C. for four hours and then the mixture is allowed to stand at room temperature overnight.

(4) *Preparation of water-soluble (sodium) salt of dextran sulphate and isolation of product*

(1) 1.5 litres of crushed ice and water are added to the mixture from stage 3;

(2) A 40% solution of sodium hydroxide is added until a dark red colour develops and two layers formed;

(3) The dark red upper layer of pyridine is then separated and rejected;

(4) Water is then added to the lower layer giving a final volume of 2 litres;

(5) The whole is then heated to 37° C. and 2 litres of alcohol are added, the syrup formed being allowed to settle for 10 minutes;

(6) The syrup is separated, and redissolved in water to give a final volume of 850 ml. The solution is then heated to 37° C. and 250 ml. of alcohol are added, the syrup formed being allowed to settle for 10 minutes;

(7) The syrup is separated and redissolved in water at 37° C. to give a final volume of 640 ml. 640 ml. of alcohol are then added, the syrup formed being allowed to separate for 10 minutes;

(8) The syrup is redissolved in 800 ml. of water and the solution is neutralised, divided into 100 ml. portions and dialysed in cellophane tubes against running tap water for 48 hours;

(9) The solution is treated with charcoal at 50° C. and this treatment is repeated to remove colour as completely as possible;

(10) The pH value is adjusted to 7-7.5;

(11) 1½ volumes of acetone are added and the syrup formed is separated. (A trace of sodium chloride facilitates precipitation);

(12) The syrup is poured into absolute alcohol with stirring. The solid material deposited is ground to powder and washed on the centrifuge with alcohol and then with dry ether; the ether is subsequently evaporated off and the residue is dried in vacuo over phosphorus pentoxide. A yield of 115.5 g. of the sodium salt=85% of the theoretical yield has been obtained experimentally, the product containing 17.15% of sulphur and having an activity of 17 International heparin units per mg; osmotic pressure measurements showed this product to have a molecular weight of about 7300, whilst its intrinsic viscosity was 0.03, as determined at 37° C. in 0.9% sodium chloride solution in a No. 1, B. S. S. Viscometer.

*Limits*

It has been found by experiment that a non-toxic dextran sulphate can only be obtained under the following conditions:

(a) *The starting material: Dextran*

The intrinsic viscosity of the Dextran must be less than 0.12, which corresponds to a molecular weight of about 22,000. To insure that the degraded dextran is free from larger molecules, it should be fractionated as hereinbefore described or in a similar manner.

(b) *The product: Dextran sulphate salt*

The sulphur content, calculated on the sodium salt, must be greater than 9%.

*Preparation of sterile solution*

For therapeutical purposes it is necessary to prepare a sterile isotonic solution of dextran sulphate salt. The solutions may be sterilised by filtration or autoclaving, but autoclaving is preferred because it is more certain and can be carried out in the final container. Since an aqueous solution of dextran sulphate salt decomposes on autoclaving with formation of sulphuric acid and reducing substances, this decomposition can be prevented by buffering the solution against pH change; a suitable buffering agent is sodium bicarbonate.

An example of a solution suitable for injection and which may be sterilised by autoclaving at 10 lbs./sq. in. for 10 minutes is:

| | Per cent |
|---|---|
| Dextran sulphate (sodium salt) | 20 |
| Sodium bicarbonate | 0.24 |
| Sodium chloride | 0.72 |

The salts of dextran sulphate that may be employed are alkali-metal salts or alkaline-earth salts.

It has heretofore been considered that an anti-coagulant is safe for therapeutic use in humans if when injected into test animals in dosages, related to the body weights of such animals, equivalent to the dosages to be used therapeutically in humans, there is no tendency to spontaneous haemorrhage in such animals. The term "non-toxic" is used herein in reference to anticoagulants such as will pass this known test.

We have found that the above requirements are satisfied by water-soluble salts of dextran sulphate prepared from dextran having an intrinsic viscosity of less than 0.12. We have prepared satisfactory specimens of dextran sulphate salts from dextran having an intrinsic viscosity of 0.02.

We claim:

1. A process for preparing non-toxic anticoagulants for use with blood and plasma, comprising esterifying a dextran having an intrinsic viscosity of less than 0.12 but not lower than 0.02, with a sulphating agent to form a sulphuric acid ester, the sulphur content of which, calculated on its sodium salt, is more than 9 per cent, and converting such ester into a water-soluble salt.

2. A process for preparing non-toxic anticoagulants for use in blood and plasma, comprising the steps of degrading a dextran of high molecular weight, fractionating the product of degradation to ensure freedom from larger molecules, and to produce a dextran having an intrinsic viscosity of less than 0.12 but not lower than 0.02, esterifying the last mentioned dextran with a sulphating agent to form a sulphuric acid ester, the sulphur content of which, calculated on its sodium salt, is more than 9 per cent, and converting such ester into a water-soluble salt.

3. A process according to claim 2, in which said fractionation comprises fractional precipitation of the degraded dextran from an aqueous solution by acetone, and rejection of at least the initial fraction.

4. A process according to claim 3, including preparing an aqueous solution of said salt, buffering such solution against change of pH value, and autoclaving such buffered solution to sterilize the latter.

5. A non-toxic anticoagulant for use with blood and plasma, comprising a water-soluble salt of dextran sulphate, the latter being the sulphuric-acid ester of a dextran of intrinsic viscosity less than 0.12 but not lower than 0.02, and having a sulphur content, calculated on its sodium salt, of more than 9 per cent.

6. A sterile solution of an anticoagulant according to claim 5, said sterile solution having been prepared by making an aqueous solution of said anticoagulant, buffering said aqueous solution against change of pH value and autoclaving said aqueous solution.

7. A sterile solution according to claim 6 containing sodium dextran sulphate, 20 per cent, sodium bicarbonate, 0.24 per cent, and sodium chloride, 0.72 per cent.

8. A process for preparing non-toxic anti-coagulants for use with blood and plasma, comprising esterifying a dextran having an intrinsic viscosity of about 0.03 with a sulphating agent to form a sulphuric acid ester, the sulphur content of which, calculated on its sodium salt, is more than 9 per cent, and converting such ester into a water-soluble salt.

9. A non-toxic anticoagulant for use with blood and plasma, comprising a water-soluble salt of dextran sulphate, the latter being the sulphuric-acid ester of a dextran of intrinsic viscosity of about 0.03, having a sulphur content, calculated on its sodium salt, of more than 9 per cent.

References Cited in the file of this patent

UNITED STATES PATENTS

| | | |
|---|---|---|
| 2,284,566 | Elsner | May 26, 1942 |
| 2,393,580 | Weiskopf | Jan. 22, 1946 |
| 2,437,518 | Gronwall et al. | Mar. 9, 1948 |
| 2,506,294 | Dechamps et al. | May 2, 1950 |
| 2,508,433 | Snyder | May 23, 1950 |
| 2,565,507 | Lockwood et al. | Aug. 28, 1951 |

FOREIGN PATENTS

| | | |
|---|---|---|
| 634,129 | Great Britain | Mar. 15, 1950 |
| 603,571 | Great Britain | June 18, 1948 |

OTHER REFERENCES

Gronwall, Nature, p. 45, Jan. 13, 1945.

Lillie, Histopathologic Technic, The Blakiston Co., Phila. 1948, pp. 55, 63 to 66 and 148 to 150.

Von Kaulla et al., Chemical Abstracts, 40, 6165 (1946).